United States Patent [19]

Dean et al.

[11] Patent Number: 5,402,191

[45] Date of Patent: Mar. 28, 1995

[54] METHOD AND APPARATUS FOR PRESENTING STEREOSCOPIC IMAGES

[75] Inventors: David M. Dean; Paul D. Panabaker; Anton L. Baljet; Sayyid K. U. Hassan, all of Oakville, Canada

[73] Assignee: Imax Corporation, Toronto, Canada

[21] Appl. No.: 987,858

[22] Filed: Dec. 9, 1992

[51] Int. Cl.⁶ .............................................. G03B 35/16
[52] U.S. Cl. ...................................... 352/63; 359/864
[58] Field of Search .......................... 352/57, 62, 63; 359/864, 865, 493; 348/57, 58

[56] References Cited

U.S. PATENT DOCUMENTS

| | | | |
|---|---|---|---|
| 3,737,567 | 6/1973 | Kratomi | 352/63 |
| 4,021,846 | 5/1977 | Roese | 352/57 |
| 4,698,668 | 10/1987 | Milgram | 358/92 |
| 4,884,876 | 12/1989 | Lipton et al. | 359/64 |
| 4,907,860 | 3/1990 | Noble | 350/334 |
| 4,971,435 | 11/1990 | Shaw et al. | 352/59 |
| 4,997,270 | 3/1991 | Shaw | 352/57 |
| 5,002,387 | 3/1991 | Baljet et al. | 352/63 |

FOREIGN PATENT DOCUMENTS 2354013 12/1977 France .

Primary Examiner—Michael L. Gellner
Assistant Examiner—Eddie C. Lee
Attorney, Agent, or Firm—Bereskin & Parr

[57] ABSTRACT

Stereoscopic images are presented by alternately displaying corresponding left eye and right eye images in succession, substantially extinguishing transmission of light from the left eye images to the right eye of a viewer and from the right eye images to the left eye of the viewer, for example by the use of polarizing filters, and alternately and in synchronism with the alternate display of images, scattering unextinguished light from the left eye images that leaks through to the viewer's right eye and from the right eye images that leaks through to the viewer's left eye. In a preferred embodiment, scattering is achieved by using a liquid crystal scattering shutter that is electrically triggered in synchronism with the display of images. The shutter disperses the unextinguished light that leaks through the system so that no image information is perceived and the light appears merely as a slight increase in background illumination.

10 Claims, 6 Drawing Sheets

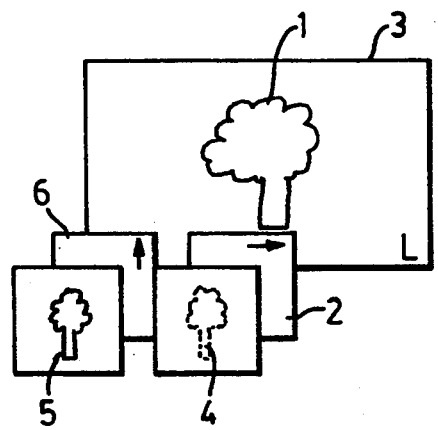
FIG. 3a(i)
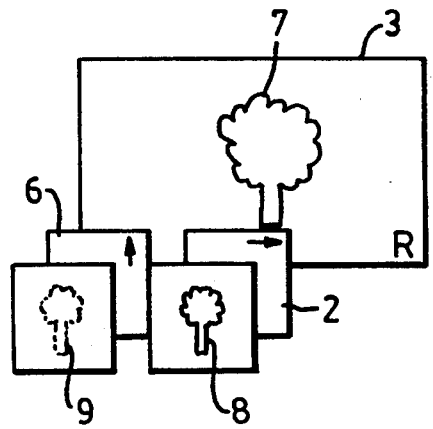
FIG. 3a(ii)
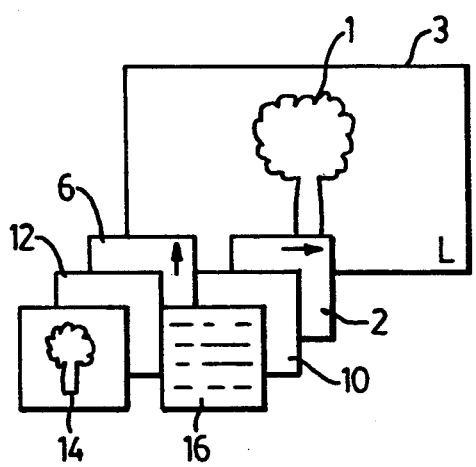
FIG. 3b(i)
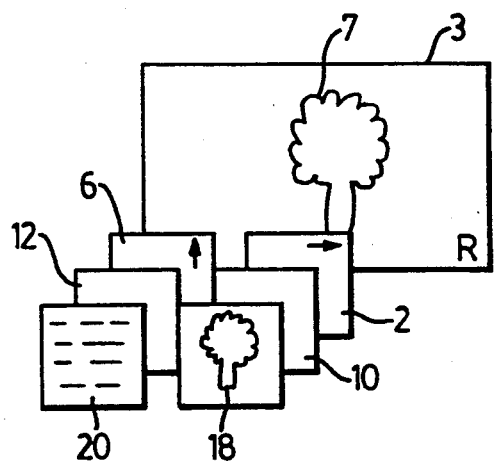
FIG. 3b(ii)

METHOD AND APPARATUS FOR PRESENTING STEREOSCOPIC IMAGES

FIELD OF THE INVENTION

This invention relates to stereoscopic displays in general and more particularly (but not exclusively) to stereoscopic motion picture projection.

BACKGROUND OF THE INVENTION

Stereoscopic 3-D imaging requires the presentation of two slightly different sets of images to a viewer; one set corresponds to a left eye viewpoint and the other corresponds to a right eye viewpoint. When the sets of images are presented so that only the left eye of a viewer can see the left eye set of images and the right eye can only see the right eye set of images, the viewer will be able to perceive a 3-D image.

Several different methods of separating left and right eye images are known. In the anaglyph method, different colour filters are used. Typically, the left eye and right eye images are projected simultaneously but in different colours, say red and blue respectively, and the viewer wears a pair of glasses fitted with red and blue filters arranged to appropriately separate the images. A major disadvantage of this method is that the resulting 3-D images are deficient in colour information.

Another method of image separation involves the use of mutually extinguishing polarizing filters. The filters are placed in front of left and right eye projectors with their polarizing axes at 90 degrees to each other. Viewers wear eyeglasses with polarizing filters arranged in the same orientation as the filters on the projectors. The left and right eye images appear on the screen at the same time, but only the left eye polarized light is transmitted through the left eye lens of the eyeglasses and only the right eye polarized light is transmitted through the right eye lens. This method is inexpensive and allows full colour 3-D images. However, it has limitations in that a substantial amount of unwanted transmission can occur and can result in the formation of objectionable ghost images. For instance, the polarization characteristics of the light can be significantly altered by reflection from a screen, though metallic screen coatings will mitigate this effect. If linear polarizers (which are most effective) are used, ghost images will also increase as the viewer tilts his or her head to the left or right.

A third known method involves time multiplexing of left and right eye images. Left and right eye images are presented alternately so that there is only one eye image on the screen at any one moment in time. Viewers wear glasses which alternately block the view of one eye so that only the correct image will be seen by each eye. In other words when a left eye image is projected onto a screen the left eye lens of the glasses will be transparent and the right eye lens will be opaque. When the image on the screen changes to a right eye image, the left lens of the glasses becomes opaque and the right eye lens becomes transparent. The glasses typically have electro-optic liquid crystal shutters and are powered by batteries. This method largely overcomes the problems of unwanted transmission due to head tilt and does not require a special screen to maintain polarization; however it is substantially more expensive than each of the other methods of image separation described previously. An additional disadvantage is that electronic alternate eye glasses weigh considerably more than passive glasses. This is a significant problem when the glasses are designed with large oversized lenses for use in a wide field of view motion picture theatre such as those marketed by Imax Corporation.

The liquid crystal shutters that are used in time-multiplexing stereoscopic imaging are usually extinguishing shutters made of at least two linear polarizers on either side of a liquid crystal cell which contains a thin layer liquid crystal material between two sheets of glass. The two polarizers are oriented with their axes generally orthogonal and the liquid crystal material acts as a variable polarizer influenced by an electric field. Such shutters block a significant proportion of the light when in an opaque state but they have limited transmission when they are in the transparent state, typically about 25–30% of incident light. The resulting images are somewhat dim, but they can be produced to have a 150:1 ratio of desired transmission to unwanted transmission, which is acceptable.

When assessing the quality of 3-D motion picture images three figures of merit are used, namely maximum transmission, extinction ratio and effective contrast. Maximum transmission is the percentage of light generated by the projectors which actually reaches the eyes of a viewer. The extinction ratio is defined as a ratio of the brightness of a correct or wanted image to the brightness of an incorrect or unwanted image that leaks through the system. In a 3-D motion picture projection system, the extinction ratio gives an indication of how much ghosting a viewer will perceive. Effective contrast is a ratio which expresses the relative difference between the extreme whites and blacks which the projection system can reproduce at the eyes of a viewer. An image with a high effective contrast ratio is sharp with a stark difference between white and black. All three of the above figures of merit are important and must be considered to produce a high quality 3-D motion picture presentation.

It is among the objects of the invention to overcome the disadvantages of known methods of stereoscopic separation. A practical aim of the invention is to provide a method of stereoscopic image separation that allows acceptable levels of extinction ratio, maximum transmission and effective contrast without undue cost.

SUMMARY OF THE INVENTION

According to a first aspect of the invention there is provided a method of presenting stereoscopic images comprising the steps of:

alternately displaying corresponding left-eye and right-eye images in succession;

substantially extinguishing transmission of light from the left-eye images to the right-eye of a viewer and from the right-eye images to the left eye of the viewer; and, alternately and in synchronism with said alternate display of images, scattering unextinguished light from said left eye images that leaks through to the viewer's right eye and from the right eye images that leak through to the viewer's left eye;

whereby stereoscopic images of a high extinction ratio are perceived by the viewer.

This aspect of the invention seeks to improve the quality of presentation of stereoscopic images and reduce or eliminate "ghosting". By alternately displaying left and right eye images while substantially extinguishing transmission of light from the left eye images to the right eye of a viewer and from the right eye images to the left eye of the viewer, so-called "cross talk" interference between the images (and resulting ghosting) is minimized. Practical limitations of currently available methods of image extinction, for example, by the use of polarizers or other filters or electro-optic shutters to mutually extinguish unwanted images inevitably results in some "leakage" of unwanted image information. The present invention seeks to eliminate that unwanted image by scattering the unextinguished light that leaks through to the eyes of the viewer. This can be accomplished by the use of electro-optic "scattering" shutters that in effect disperse the unwanted light as a slightly increased level of background illumination. By this expedient, it has been found possible to dramatically improve the extinction ratio of the system while retaining high levels of maximum light transmission and acceptable background contrast.

It should be noted that the corresponding left and right-eye images may overlap in time. This improves the level of maximum light-transmission but at the expense of some ghosting. Thus, references herein to "alternate" display of images does not indicate that the images must be presented separately (as is the case with prior art time-multiplexing systems).

In a practical example of the first aspect of the invention as applied to a motion picture projection system, the left and right eye images are alternately projected using projectors provided with polarizing filters arranged with their axes at 90 degrees to each other. Corresponding polarizing filters are provided on eyeglasses worn by the viewer and substantially extinguish transmission of unwanted image information to the viewer's eyes. The eyeglass lenses also incorporate electro-optic scattering shutters that are activated alternately to disperse any unextinguished and unwanted light that leaks through the polarizing filters so that the unwanted light appears as increased background illumination. No perceptible image information is transmitted. Accordingly, the extinction ratio of the system is high in that the "wanted" or correct image appears at full brightness (subject to other optical limitations of the system) while there is virtually no incorrect or unwanted image information.

According to another aspect of the invention there is provided an method of presenting stereoscopic images which comprises the steps of:

alternately displaying in succession corresponding left-eye and right-eye images of respective series of such images; and substantially extinguishing transmission of light from the left-eye .images to the right eye of a viewer and from the right-eye images to the left eye of the viewer, by optically coding the images and providing the viewer with eyeglasses that include optical decoding means;

wherein the images in each said series are displayed in a repeating on/off cycle which is the same for both series of images and in which the "on" portion of the cycle is longer than the "off" portion of the cycle so that the images partially overlap;

whereby stereoscopic images of high maximum transmission are achieved.

This aspect of the invention may be practised with or without the use of scattering shutters or other means to scatter unextinguished light from the left-eye images that leaks through to the viewer's right eye and from the right-eye images that leaks through to the viewer's left eye. Where such scattering means are employed, they will be activated for each series of images during the "off" portion of the cycle for those images only. For example, where scattering shutters are used in a pair of eyeglasses, the scattering shutter for the left eye lens will be activated during the "off" portions of the cycle for the display of left-eye images. Conversely, the scattering shutter in the right eye lens will be activated during "off" portions of the right-eye image display cycle. Neither shutter will be activated during the portions of the cycle for which the images overlap. Accordingly, the improvement in maximum transmission will be at some expense in terms of reduction in scattering of ghost images.

As noted previously, this aspect of the invention relies on optical coding of the images and providing the viewers with eyeglasses that include optical decoding means for eliminating or reducing the ghosting that would otherwise occur during portions of the cycle in which the images overlap. Optical coding/decoding may be effected by using polarizing filters as described previously or by other optically distinguishing filters such as colour or wavelength band pass filters.

The invention also provides corresponding apparatus for presenting stereoscopic images, and eyeglasses for use in the invention.

BRIEF DESCRIPTION OF THE DRAWINGS

The invention will be better understood with reference to the drawings which illustrate particular preferred embodiments of the invention, as compared with the prior art. By way of example, these embodiments relate to motion picture projection systems.

In the drawings:

FIG. 3 illustrated the effects of scattering a ghost image;

DESCRIPTION OF PREFERRED EMBODIMENTS

Figure 1A:
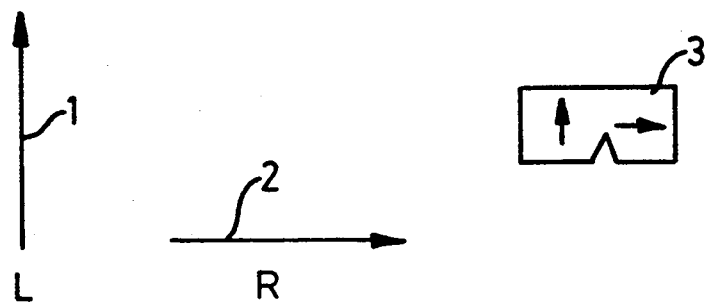
FIG. 1 is a series of schematic drawings illustrating the disadvantages of the linear polarizer method of image separation.

FIG. 1a) depicts the orientation of linear polarizing filters used in prior art systems which substantially separate left and right eye images. Linear polarizing axis 1 is vertical and corresponds to left eye images and linear polarizing axis 2 is horizontal and corresponds to right eye images. Eyeglasses 3, have left and right eye lenses made of polarizing filters with identical orientations to those in front of the projection lenses.

An example of a system of this type is disclosed in U.S. Pat. No. 4,957,301 (Shaw), the disclosure of which is incorporated herein by reference.

Figure 1B:
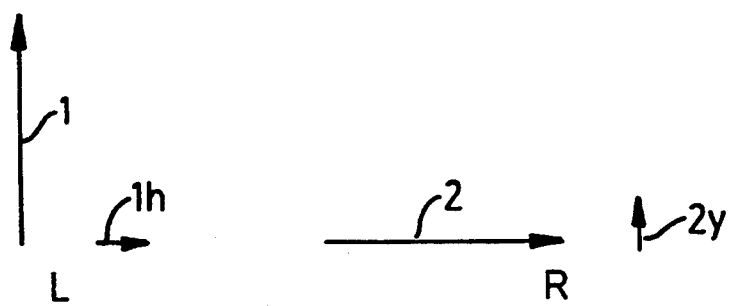

FIG. 1b) illustrates the results of linear polarized light reflecting from a non-ideal front projection screen. About 98% of the vertically polarized left eye light 1 remains vertically polarized and (correctly) passes through a vertically polarizing filter, while about 2% of the light (1h) becomes horizontally polarized and will "leak" through a horizontally polarizing filter (in FIG. 1a, the right eye lens). Similarly about 2% of horizontally polarized light 2 (2 v) will leak through a vertically polarizing filter (the left eye lens). The contaminating light comes from both rotation of the direction of polarization and depolarization at the screen surface. In prior 3-D systems using polarizers the contaminating light is transmitted through the opposite eye's filters in the eyeglasses, forming a sharp, perceptible ghost image.

Figure 1C:
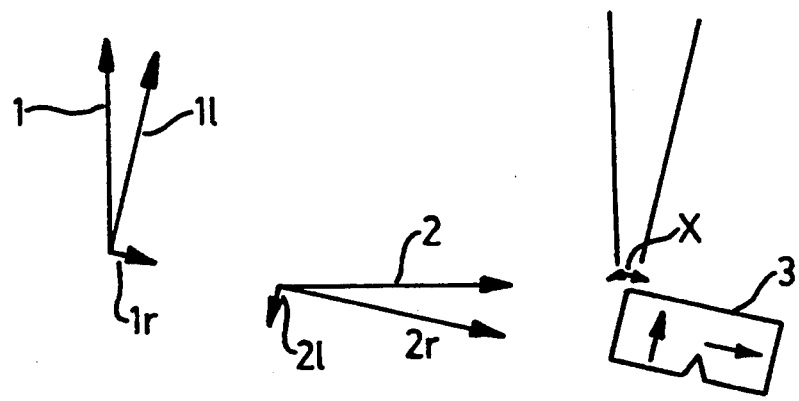

FIG. 1c) illustrates another problem of prior art linear polarizer 3-D systems caused by audience members tilting their heads. The eyeglasses, 3 are shown rotated "x" degrees from the vertical. Left eye light, 1 is vertically polarized and right eye light is horizontally polarized.

The vertically polarized light, 1 can be represented by two orthogonal vectors 1l and 1r which are parallel to the left and right eye axes of polarization of the lenses of the eyeglasses when they are tilted at "x" degrees from the vertical. Vector lr represents left eye light that will be transmitted through the right eye lens of the eyeglasses and perceived as ghosting. Similarly vector 21 represents right eye light which will be transmitted through the left eye lens. Head tilting is problematic because even a slight tilt will cause significant ghosting and thereby noticeable degrade the quality of a 3-D motion picture presentation. Circular polarizers, which can address this problem, suffer from ghosting which is roughly double that of linear polarizers, due to poorer extinction by the filters, and more polarization degradation on reflection from screens.

In contrast with prior art methods, a first aspect of the invention provides for scattering shutters to be incorporated into the lenses of the viewer's eyeglasses, in combination with image extinguishing means such as polarizing filters. The scattering shutters are activated alternately and generally in synchronism with the substantially alternate display of images so that unextinguished light from the left eye image that leaks through the viewer's right eye filter (and vice-versa) is scattered and no longer transmits image information to the viewer.

Furthermore, the second source of ghosting, namely left eye image light which is incorrectly polarized and hence freely transmitted by the right eye filter, is also scattered by the shutter in the right eye lens.

Figure 2A:
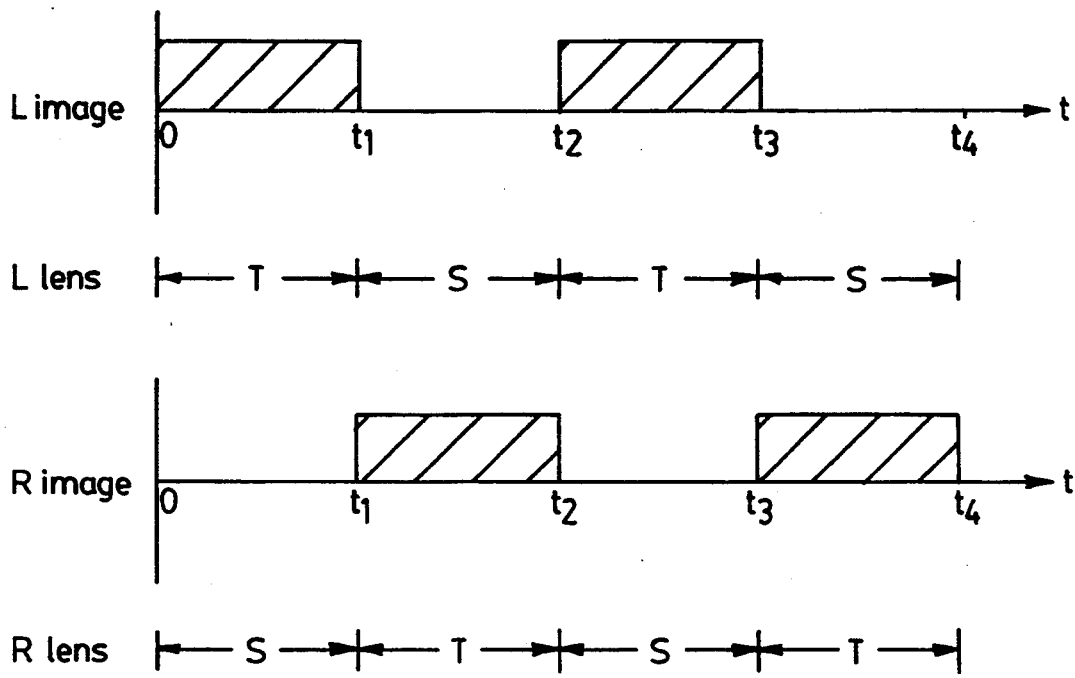
FIG. 2 comprises four graphs illustrating two possible methods for temporal multiplexing of left and right eye images in accordance with the invention.

Referring more specifically to the drawings, FIG. 2 illustrates the alternate projection of left and right eye images of the inventive method. By alternately displaying left and right eye images, and shuttering the glasses with the same temporal frequency, both sources of leakage or ghosting are removed from the system. In FIG. 2a) the left and right eye images are alternately displayed in a repeating on/off cycle in which the "on" and "off" portions of the cycle are of equal length (a "50/50" duty cycle), so that there are never left and right eye images on the screen at the same time. When a left image is projected, the left lens of a pair of 3-D eyeglasses is transparent (time period T), whereas the right eye lens is activated (time period S) to scatter the left eye image that leaks through the right eye polarizer. Likewise, when a right eye image is projected the left lens is activated scattering the right image leakage. This timing arrangement will maximize the amount of ghost scattering.

Figure 2B:
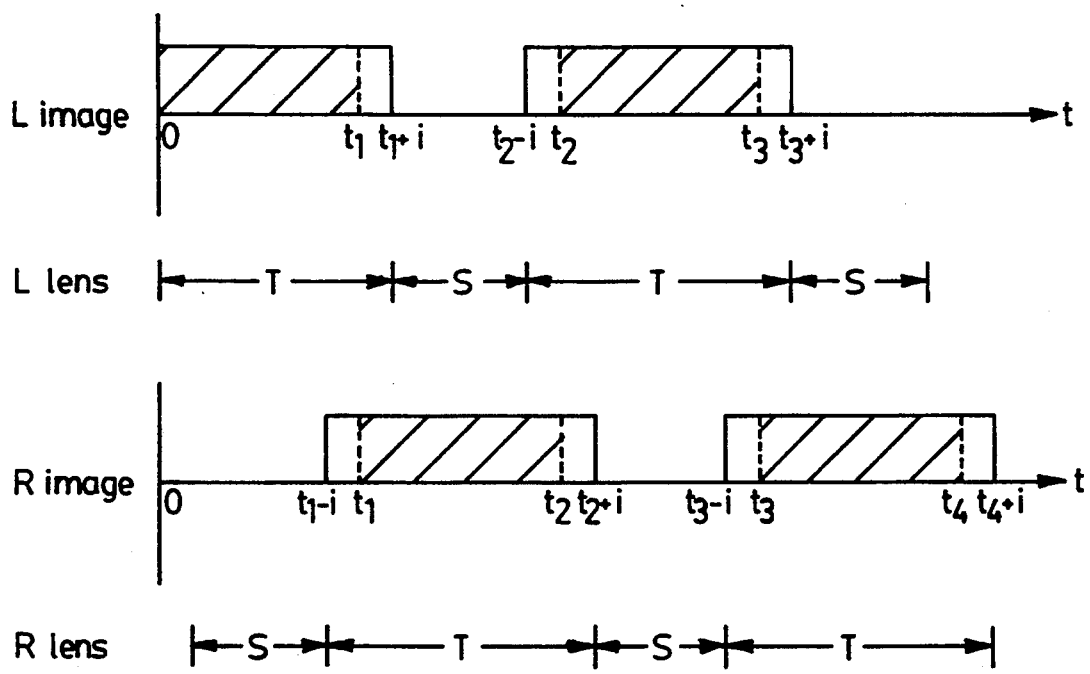

A modification of the left and right image sequencing illustrated in FIG. 2a) is possible which will improve the overall brightness of the projected images at the expense of some performance in ghost scattering. In FIG. 2b), left and right eye images are projected with a duty cycle of 66/33 so that they both appear on the screen for ⅓ of the time. This improves the overall brightness of the system by 33%. Image overlap occurs during the period t1−i to t1+i, t2−i to t2+i etc. The image overlap decreases the amount of time that the scattering shutters can be used to reduce ghosting since each scattering shutter is only activated while there is no corresponding image on the screen. As a result the amount of ghost scattering is reduced by 33%. The duty cycle illustrated in FIG. 2b) is illustrative only and any number of possible duty cycles in which the "on" portions of the cycle are longer than the "off" portions can be chosen to optimize the overall quality of the 3-D images.

It is to be noted that scattering shutters need not necessarily be used in this aspect of the invention. For example, if maximum transmission is the overriding concern, the scattering shutters may be eliminated. Polarizing filters or other optical coding means must be used in any event to separate the two images during overlapping portions of the cycle.

Where scattering shutters are used, the scattered ghost image light is distributed more or less evenly over the entire shutter area and contributes to a slight increase in the overall background illumination. This slightly degrades the effective contrast of the image but is perceptually much less objectionable than a ghost image. The combination of alternate image projection and the use of alternately activated scattering shutters would similarly eliminate ghosting due to head tilting.

Commercially available scattering shutters have a high transmission when they are in their transparent state, typically about 80–90% However, the transmission in the scattering or diffuse state is also relatively high, at about 10–25%. Such poor extinction makes scattering shutters unsuitable on their own as a practical method for 3-D stereoscopic viewing. The high transmission of the scattering shutters in the transparent state does make them particularly suitable in a series combination with polarizers since adding them does not significantly degrade the overall transmission of light in the system.

Electro-optic scattering devices have been known since the late 1960's when Dynamic Scattering liquid crystals were used in the first LCD watches and calculators. These devices are now obsolete, and have been replaced by field-effect "twisted" nematic liquid crystal displays which have superior optical and electrical performance. A new class of light scattering materials, polymer dispersed liquid crystals, have characteristics which make them well suited for the inventive stereoscopic display method. Typically they consist of micron sized droplets of nematic liquid crystal material dispersed in a polymer binder. The droplets strongly scatter light in a passive state and as a result the material has a white translucent appearance. When an electric field is applied the liquid crystal droplets realign and the material becomes transparent. Polymer dispersed liquid crystal cells are relatively inexpensive when compared with extinguishing type liquid crystal shutters in large area displays because they do not require as stringent manufacturing requirements. Another advantage of PDLC's is that they can be manufactured on flexible substrates. It is thus possible to develop 3-D eyeglasses with curved shutters extending to the periphery of vision which give viewers a very wide field of view. This is particularly advantageous when the shutters are used in conjunction with a wide-field-of-view motion picture theatre such as those built by Imax Corporation.

Examples of electro-optic scattering shutters are disclosed in U.S. Pat. Nos. 4,698,668 (Milgram) and 4,907,860 (Noble). The disclosure of these references are incorporated herein by reference.

FIG. 3 schematically illustrates how the inventive method reduces perceptible ghosting and improves the quality of a 3-D presentation. FIG. 3a) illustrates the prior art. A left eye image 1 of a tree is projected onto a screen 3. The left eye image is linearly polarized vertically and is substantially transmitted through a vertical linear polarizing filter 6 in a pair of 3-D eyeglasses and is seen by the left eye of the viewer as the correct left eye image of a tree 5. Some of the left eye light leaks through a horizontal linear polarizer 2 that acts as the right eye lens in a pair of 3-D eyeglasses and is perceived by the right eye as a ghost image 4 of the tree. FIG. 3a) ii illustrates the reciprocal case when a right eye image 7 of the tree 1 is projected onto screen 3 and is substantially seen by a viewer's right eye as a correct image 8 and as a ghost image 9 by the left eye.

FIG. 3b) illustrates the inventive method of scattering unwanted ghost images. Electro-optic light scattering shutters 10, 12 are incorporated into the 3-D eyeglasses worn by a viewer.. The left eye of the viewer sees the left eye image 14 of the tree after it passes through a scattering shutter 12 that is in a transparent state. Image 14 is slightly less bright than image 5 in FIG. 3a) as a result of passing through transparent shutter 12. The right eye of the viewer sees only the scattered ghost image 16 since the right eye scattering shutter 10 is activated and is in a scattering state. FIG. 3b) ii illustrates the reciprocal case where a right eye image 7 of a tree is projected onto screen 3 and is seen as an image 18 by the right eye of a viewer after passing through a scattering shutter 10 in a transparent state. The right eye image light which leaks through left eye polarizer 6 is scattered by shutter 12 which is activated and is in a scattering state. The perception of ghost images is effectively eliminated as a result of including scattering shutters 10 and 12 and the scattered images 16 and 20 are perceived only as a slight increase in background illumination. As a result the perceived quality of the 3-D presentation is greatly improved.

Figure 4:
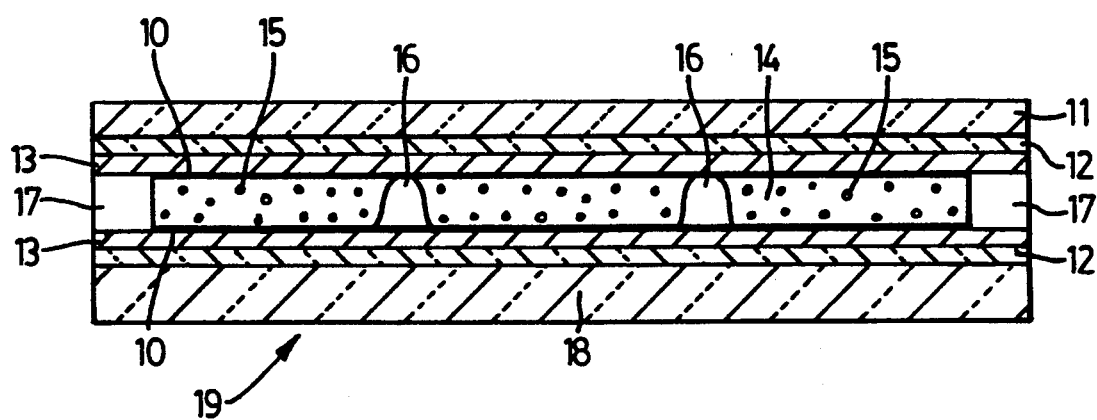
FIG. 4 is a cross-sectional view through an eyeglass shutter lens in accordance with a preferred embodiment of the invention; and, FIGS. 5 and 6 are diagrammatic representations of a theatre employing a 3-D projection system during projection of a right-eye image and a left-eye image respectively.

FIG. 4 illustrates a further form of lens assembly that may be useful in the method of the invention. The lens assembly is essentially a liquid crystal cell that incorporates an electro-optic shutter, 19. The cell contains two substrates; substrate 11 is a linear polarizer film and substrate 18 is a thin flexible sheet of optically transparent polymer such as polyester. Both substrates 11 and 18 are coated with a transparent protective layer 12 to provide resistance against chemical damage during the fabrication process and from the liquid crystal material in the cell. Transparent electrically conductive layers of indium tin oxide 13 are placed over the protective layers 12. A thin polymer alignment layer 10 is applied over the conductive layers to promote alignment of liquid crystals in a transparent matrix 14 (to be described). An edge seal 17 extends around the periphery of the cell and acts to contain the contents of the cell as well as maintain the required spacing of about 10 microns between the upper and lower substrates (11 and 18). Spacers 16 are deposited over the inner surfaces of the cell to ensure spacing uniformity between the upper and lower substrates over the entire area of the cell. A multitude of spherical droplets of liquid crystal material 15 are held rigidly in place by a polymer matrix 14. In the relaxed state, the liquid crystal material strongly scatters light which passes through the cell. When an electric field is generated between the two conductive layers 13 the liquid crystal material in the droplets 15 is re-oriented in a manner which allows light to pass through with no scattering. Since both substrates are flexible, the scattering shutter 19 can be formed into a curved profile in a pair of 3-D eyeglasses to give and extended and comfortable field of view.

In a motion picture projection system, alternate projection of left and right eye images can be achieved, for example, by projecting the images from two separate filmstrips using two projectors that are synchronized with one another. Alternatively, U.S. Pat. No. 4,966,454 (Toporkiewicz) discloses an example of a single rolling loop projector capable of so-called "alternate image" projection from two separate filmstrips.

The electro-optic scattering shutters incorporated in the eyeglasses worn by the viewer must be activated in synchronism with projection of the images. This can be accomplished in a variety of ways, for example by suitable electrical circuitry for triggering the shutters in synchronization with the projector or projectors. U.S. Pat. No. 5,002,387 (Baljet et al.) discloses a projection synchronization system in which infrared signals are used to synchronize prior art blocking shutters in a time multiplexing stereoscopic system. The disclosure of this patent is incorporated herein by reference.

Figure 5:
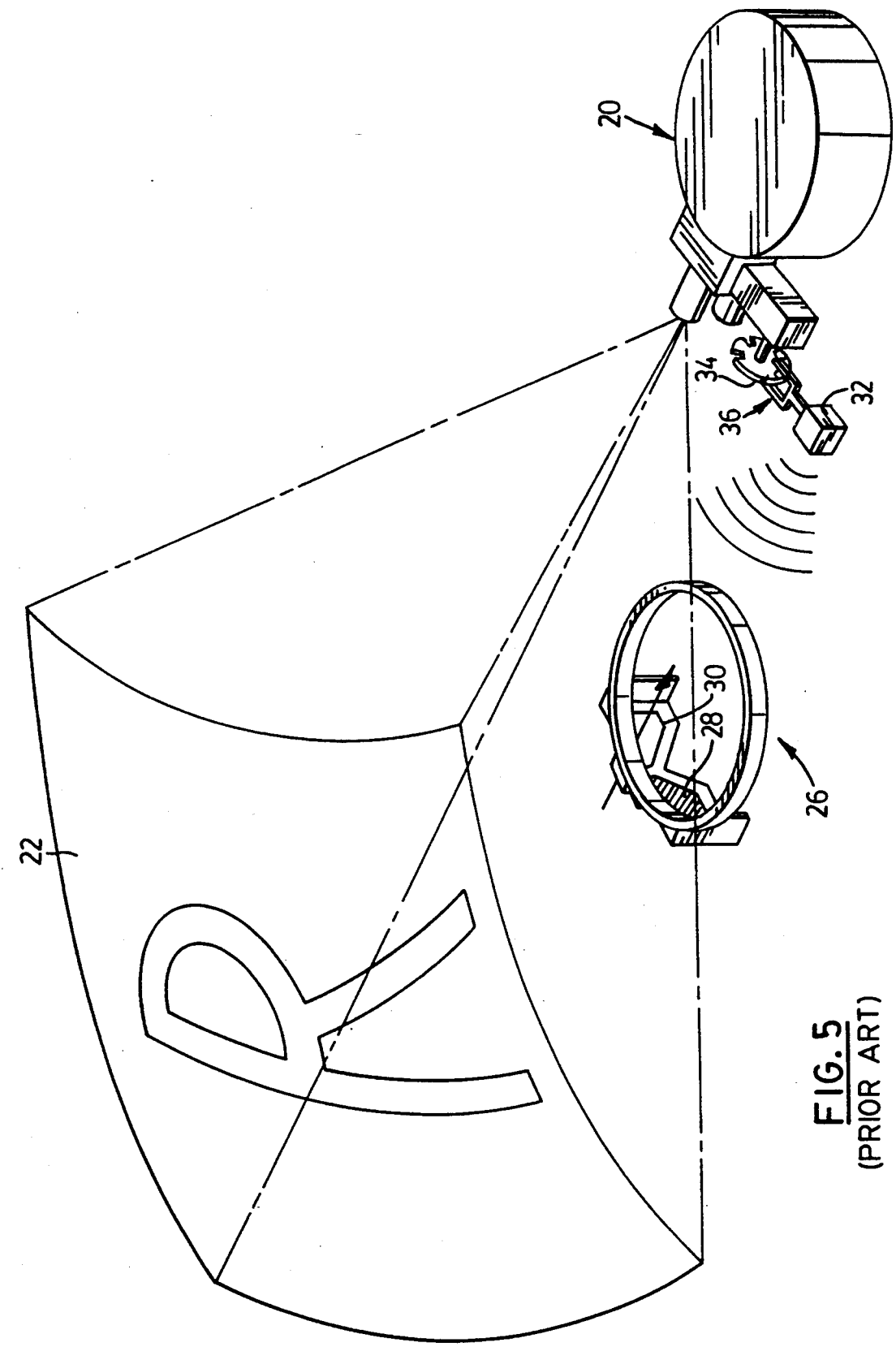
Figure 6:
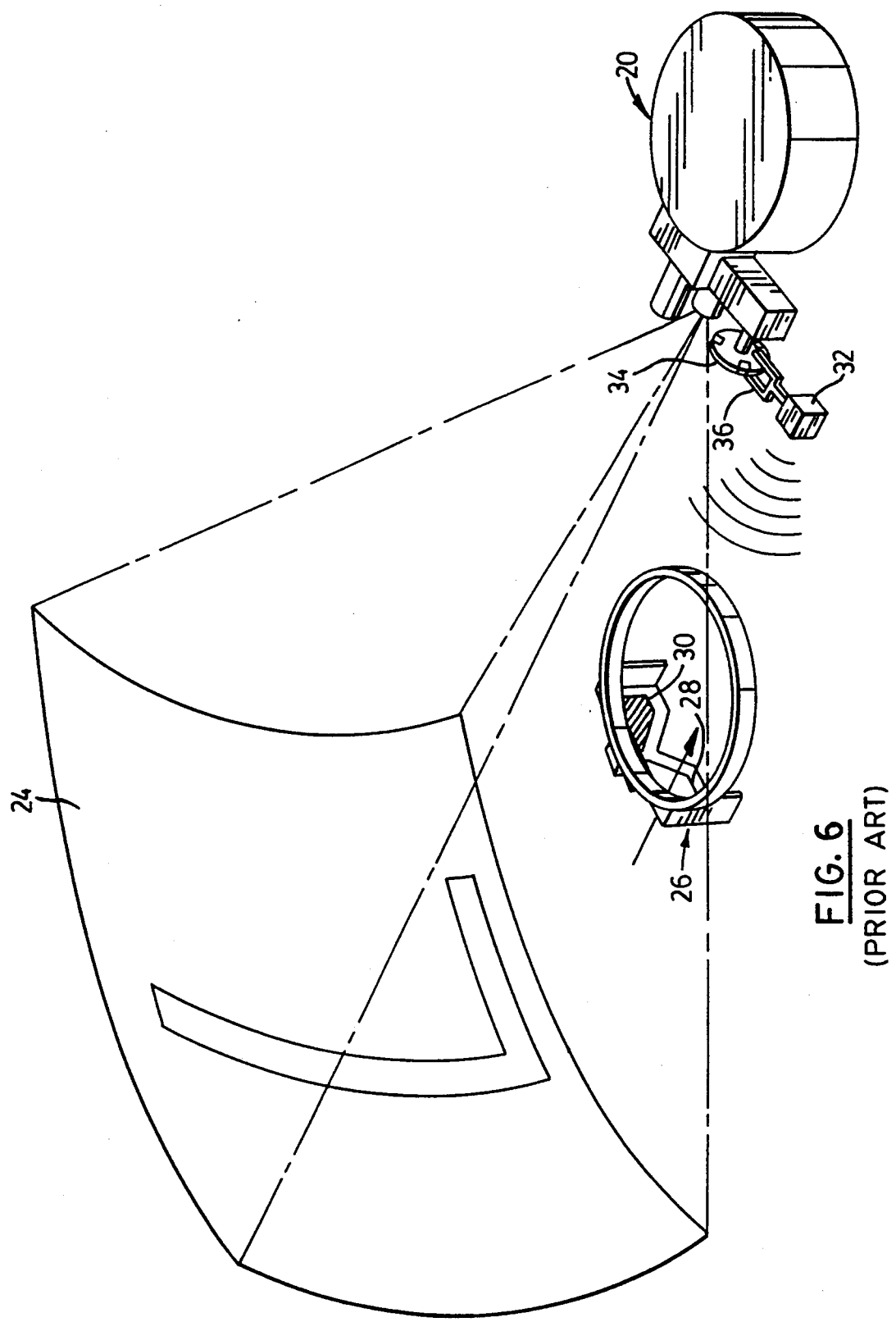

FIGS 1 and 2 of the Baljet et al. patent are reproduced herein as FIGS. 5 and 6 respectively but using different reference numerals for the sake of clarity. Reference may be made to the BalJet et al. patent for a full description of these views. For present purposes, it is sufficient to note that FIGS. 5 and 6 show means for alternately displaying left-eye and right-eye images in succession, in the form of a projector 20 for projecting motion picture images which alternate between a right-eye image such as that shown at 22 in FIG. 5 and a left-eye image such as that shown at 24 in FIG. 6.

FIGS. 5 and 6 also show means for substantially extinguishing transmission of light through a viewer's left eye when a right-eye image is projected (FIG. 5) and for substantially extinguishing transmission of light to a viewer's right eye, when a left-eye image is displayed (FIG. 6). In FIGS. 5 and 6, these means take the form of a pair of 3-D glasses indicated at 26. The glasses have left and right lenses denoted 28 and 30 respectively formed by liquid crystal cells, which alternate between opaque and transmissive states according to infrared signals transmitted from the projector 20 to a receiver in the glasses. Again, the BalJet et al. patent should be referred to for a full description of how this is accomplished. For present purposes, it is sufficient to note that FIG. 5 shows the left lens 28 in an opaque state while the right lens 30 is transmissive, so that transmission of light from the right-eye image 22 to the viewer's left eye is substantially extinguished. Conversely, in FIG. 6, transmission of light from the left-eye image 24 to the viewer's right eye is substantially extinguished by the opaque right lens 30 of the 3-D glasses 26.

A transmitter of infrared signals is shown at 32 in association with projector 20 and is controlled by a timing shutter 34 driven by the projector 20, via a sensor 36. By appropriate design of the timing shutter 34 and/or of the infrared signal transmission circuitry, the time periods for which the respective lenses 28 and 30 are opaque and transmissive can be adjusted as desired. Similarly, the time periods for which the respective images 22 and 24 are projected can be adjusted by appropriate shuttering of the projector 20 in order to provide for displayed images that overlap in time as described with reference to FIG. 2 of the present application.

The following discussion will further illustrate the advantages of the use of scattering shutters in accordance with the invention, as compared with the prior art:

In a typical 3-D motion picture system using polarizers there is a degradation or loss of correctly polarized light at three different stages in the path of light from the projector lenses to the eyes of a viewer.

The first loss of available light occurs when light leaving the projection lenses passes through linear polarizing filters. Typically only about 42% of the available light generated by the lamphouse of a projector will be correctly polarized after passing through a linear polarizing filter. Additionally about 0.01% of the light leaving the filter will be incorrectly polarized—that is polarized in an orthogonal direction to the correctly polarized light.

The second reduction in the amount of correctly polarized light occurs when the light is reflected from a projection screen. There is a tendency for linear polarized light to depolarize upon reflection from a surface, although a metallic screen helps considerably with this. There is also a tendency for the direction of polarization to rotate slightly on reflection from different surfaces. Typically around 97% of the light will maintain the correct polarization, 1% of the light will rotate to the wrong polarization, and 2% will be depolarized (hence being equally split between correct and wrong polarization).

The third reduction in the amount of correctly polarized light occurs when the light is transmitted through the linear polarizing filters found in the eyeglasses worn by members of the audience. Typically only about 76% of correctly polarized light is transmitted and about 0.01% of incorrectly or orthogonal polarized light is transmitted.

The quality figures of merit for a 3-D motion picture system can be calculated using the above information by considering the effects of each image reduction stage in succession upon light transmission, extinction ratio and effective contrast.

Figures of merit for the inventive method can be calculated for comparison by including the effects of adding scattering electro-optic shutters to the 3-D eyeglasses. The scattering shutters have an on state transmission of about 85%, an off state transmission of 1% and an off state diffuse transmission of about 10% (into a typical solid angle subtended by a viewer's eye). The table below illustrates the advantages of the invention. The first column contains the three image quality figures of merit for the prior art method of 3-D motion picture projection using linear polarizers in front of the projection lenses and in eyeglasses worn by members of the audience. The second column contains the three figures of merit for the inventive 3-D method. The extinction ratio of the inventive shutters is increased dramatically (over 8500%) as a result of incorporating electro-optic scattering shutters into the 3-D glasses. The maximum transmission and the effective contrast ratio when using the inventive method are only marginally decreased. The third and fourth column contain the quality figures of merit for the prior art and the inventive method for the case when the head of a viewer is tilted 15 degrees from the vertical. Again there is a great increase in the extinction ratio when the inventive method is used accompanied by a modest decrease in the other two figures of merit. Overall the quality of a 3-D presentation is greatly improved when using the inventive method.

As a guideline, the figures of merit should be judged as follows: transmission should be maximized; extinction ratio should be a minimum of 100:1, though improvements up to 1000:1 may be worthwhile; effective contrast should be a minimum of 25:1, though improvements up to 100:1 may be worthwhile.

|  | Prior Art | Inv. | Prior Art @ 15 deg. | Inv. @ 15 deg. |
| --- | --- | --- | --- | --- |
| Maximum Transmission | 31.0 | 26.3 | 28.9 | 24.6 |
| Extinction Ratio | 93.6 | 7,970 | 12.1 | 1,030 |
| Effective Contrast | 60:1 | 59:1 | 60:1 | 52:1 |

An additional benefit of the invention is that some materials can now be used in the system which otherwise could not because of their contribution to excessive ghosting. An example is the use of circular polarizers which separate light into clockwise and counterclockwise polarized light. They can be used in the place of linear polarizing filters in a 3-D presentation system and they have the advantage that they are largely immune to ghosting caused by head tilt. However they exhibit less polarization preservation upon reflection from front projection screens. Typically they exhibit a extinction ratio of roughly half that of a linear polarizer, although this does remain fairly constant at different head tilt angles. By using the inventive method with circular polarizers, the extinction ratio can be increased to acceptable values for any angle of head tilt.

The invention addresses several limitations and disadvantages of prior art systems. It provides a 3-D image separation method that has a high extinction ratio and is not susceptible to ghosting caused by head tilting. Electro-optic scattering liquid crystal shutters are less expensive to manufacture than typical liquid crystal optical shutters and can be incorporated in wide-field-of-view 3-D eyeglasses with curved lenses extending into the periphery of vision, for use in a wide-field-of-view motion picture theatre.

The above description should not be construed as limiting the scope of the invention but as merely providing illustrations of some of the preferred embodiments of this invention. For example although polarizing filters are described, other optically extinguishing filters such as colour or wavelength band pass filters could be used.

Electro-optic blocking shutters could also be used. Shutters of this type are well-known in the prior art and are disclosed for example in U.S. Pat. No. 4,424,529 (Roese et al.). Practical examples of shutters of this type are reasonably efficient at blocking light. However, some leakage of light can occur and can result in unacceptable ghosting. As a practical matter, presently available examples of this type of shutter are relatively expensive and have the disadvantage such, while this type of shutter could certainly be used in principle, this may be impractical at the current stage of technology.

Scattering of unwanted image information is preferably achieved using electro-optic scattering shutters as described previously. However in principle, other scattering means could be used, for example, scattering filters in combination with mechanical means for displacing the filters into and out of the viewer's line of sight for each eye.

Finally, while reference has been made primarily to use of the present invention in motion picture systems in which the images are normally projected onto a screen, other methods of display such as display on a television or a computer monitor are possible in the context of the present invention.

We claim:

1. A method of presenting stereoscopic images which comprises the steps of:
   alternately displaying to a viewer corresponding left eye and right eye images in succession; and
   separating said left eye and right eye images presented to the viewer by:
   (i) substantially extinguishing transmission of light from the left eye images to the right eye of the viewer and from the right eye images to the left eye of the viewer; and
   (ii) alternately and in synchronism with said alternate display of images, scattering any remaining unextinguished light from said left eye images that leaks through to the viewer's right eye and from the right eye images that leaks through to the viewer's left eye;
   whereby stereoscopic images of high extinction ratio are perceived by the viewer.

2. A method as claimed in claim 1, wherein said images are displayed by projecting the images onto a screen and wherein the step of substantially extinguishing transmission of light is performed by optically filtering the light that is projected onto the screen and correspondingly filtering the light that reaches the eyes of the viewer by providing the viewer with eyeglasses that include optical filters, the filters being selected to substantially extinguish transmission of light from the left eye images to the right eye of the viewer and from the right eye images to the left eye of the viewer.

3. A method as claimed in claim 2, wherein said filtering step is performed using mutually extinguishing polarizing filters.

4. A method as claimed in claim 1 wherein said step of alternately scattering unextinguished light is performed by providing the viewer with eyeglasses having lenses that include electro-optic liquid crystal cells that are capable of adopting a scattering state and a transmissive state, and alternately activating said cells in synchronism with said alternate display of images so that, when a left eye image is displayed, the cell in the right eye eyeglass lens is activated and when a right eye image is displayed, the cell in the left eye eyeglass lens is activated.

5. A method as claimed in claim 1,
   wherein said corresponding left-eye and right-eye images are displayed as respective series of such images;
   wherein said step of substantially extinguishing transmission of light from the left-eye images to the right eye of a viewer and from the right-eye images to the left eye of the viewer is performed by optically coding the images and providing the viewer with eyeglasses that include optical decoding means;
   and wherein the images in each said series are displayed in a repeating on/off cycle which is the same for both series of images and in which the "on" portion of the cycle is longer than the "off" portion of the cycle so that the images partially overlap;
   whereby said stereoscopic images are also of high maximum transmission.

6. An apparatus for presenting stereoscopic images, which comprises:
   means for alternately displaying corresponding left eye and right eye images in succession;
   means for substantially extinguishing the transmission of light from the left eye images to the right eye of a viewer and from the right images to the left eye of a viewer; and,
   means for alternately and in synchronism with said alternate display of images, scattering unextinguished light from said left eye images that leaks through said extinguishing means to the viewer's right eye and from the right eye images that leaks through said extinguishing means to the viewer's left eye.

7. An apparatus as claimed in claim 6, wherein said images are displayed by projecting the images onto a screen and wherein said means for substantially extinguishing transmission of light comprises means for optically filtering the light that is projected onto the screen and corresponding means for filtering the light that reaches the eyes of the viewer, the filtering means being selected to substantially extinguish transmission of light from the left eye images to the right eye of the viewer and from the right eye images to the left eye of the viewer.

8. An apparatus as claimed in claim 7, wherein said filtering means comprises mutually extinguishing polarizing filters.

9. An apparatus as claimed in claim 6, wherein said means for scattering unextinguished light comprises eyeglasses having lenses that include electro-optic liquid crystal cells that are capable of adopting a scattering state and a transmissive state, and means for alternately activating said cells in synchronism with said alternate display of images so that, when a left eye image is displayed, the cell in the right eye eyeglass lens is activated and when a right eye image is displayed, the cell in the left eye eyeglass lens is activated.

10. Eyeglasses for viewing stereoscopic images comprising corresponding left-eye and right-eye images displayed in succession, the eyeglasses having respective left-eye and right-eye lenses and including means for substantially extinguishing transmission of light from displayed left-eye images to the right eye of a viewer and from displayed right-eye images to the left eye of the viewer, and means for alternately and in synchronism with said alternate display of images, scattering unextinguished light from the left-eye images that leaks through the extinguishing means to the viewer's right eye and from the right-eye images that leaks through said extinguishing means to the viewer's left eye, each of said lenses including one of blocking shutter means and filter means for providing said substantial extinction of light transmission, and an electro-optic scattering shutter which is actuable in synchronism with said alternate display of images, between a transmissive state and scattering state.

* * * * *